2,251,881

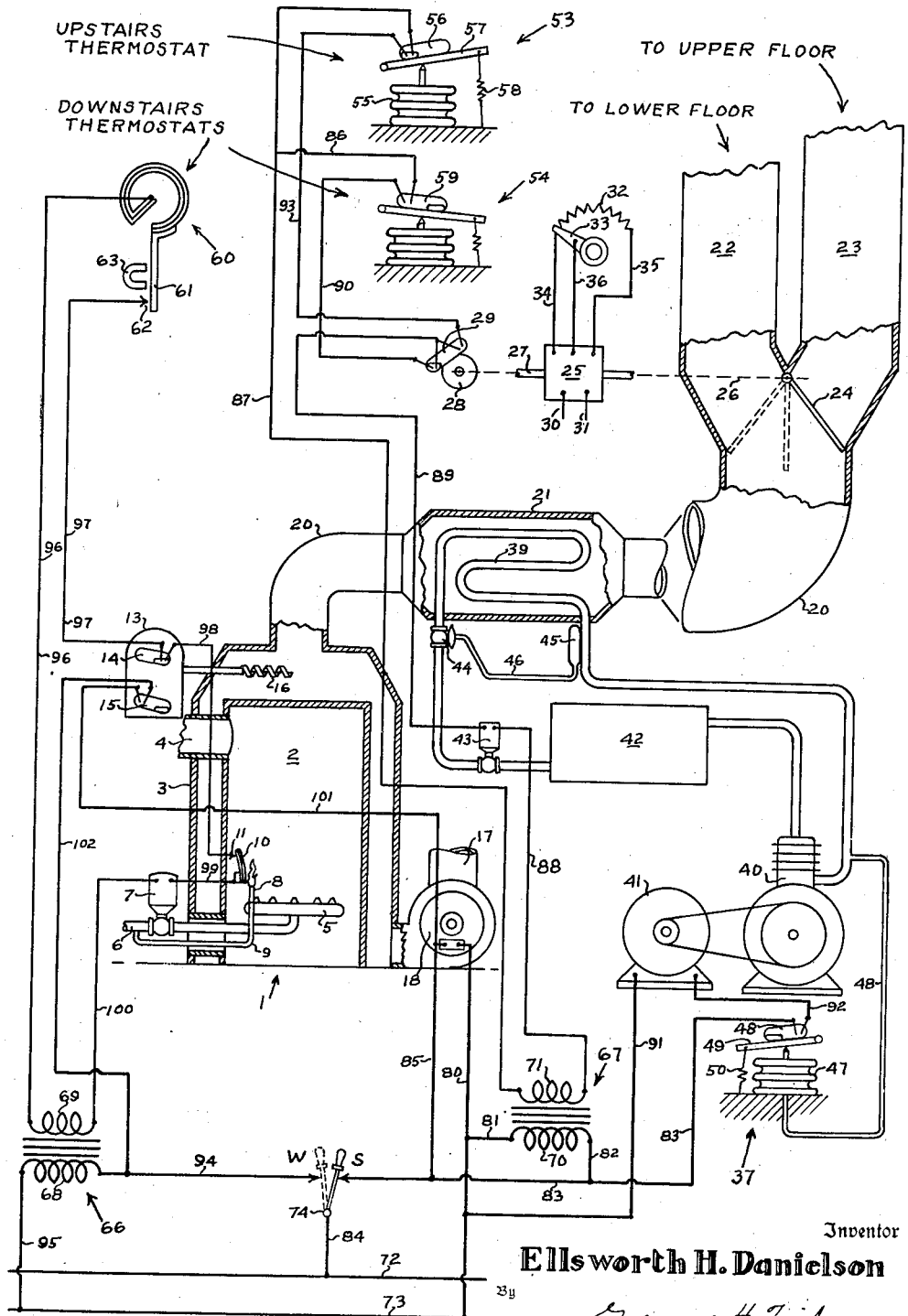
Aug. 5, 1941.  E. H. DANIELSON  2,251,881
ZONE AIR CONDITIONING CONTROL SYSTEM
Filed June 23, 1938
Inventor
Ellsworth H. Danielson Patented Aug. 5, 1941

UNITED STATES PATENT OFFICE 2,251,881

ZONE AIR CONDITIONING CONTROL SYSTEM

Ellsworth H. Danielson, Des Moines, Iowa, assignor to Minneapolis-Honeywell Regulator Company, Minneapolis, Minn., a corporation of Delaware Application June 23, 1938, Serial No. 215,429

3 Claims. (Cl. 236—1)

My invention is in the field of air conditioning control and is more particularly directed to a novel system and method of control of the zone type. More specifically, my invention is concerned especially with air conditioning equipment in buildings planned for zone operation wherein all zones need not necessarily be served at once but wherein it is more usual that only a single zone need be conditioned at a time. An ordinary dwelling having the upstairs forming one zone and the downstairs a second zone is an example of the type of application to which my invention is preferably adaptable. Usually occupants of such a residence require air conditioning of the downstairs rooms only during the day and of the upstairs bedrooms only during the night. My object is to provide a control combination for selecting one of such zones and automatically placing a thermostat or like control instrument in that zone in control of the air conditioning equipment. Thus the expense of operation of the apparatus may be reduced to that necessary for a single zone and if desired the capacity of the system may be only sufficient for a single zone so that initial cost of equipment is small.

I employ both heating and cooling equipment in my system for winter and summer use and I provide a duct and damper arrangement for the various zones whereby I may cool an individual zone or I may serve two or more zones by circulating heated air thereto, for example. Thus I may shift from the cooling to the heating side of my system for winter operation and supply heated air simultaneously to both the upstairs and downstairs through the same duct system as employed in the summer time.

Among further objects of my invention are:

The provision of a zone type air conditioning system having air distributing ducts and a damper such that an individual zone may be selected for conditioning and a control arrangement such that the system is controlled from the individual zone selected.

The provision of a multiple zone air conditioning system which may preferably comprise a residence having the upstairs and downstairs forming the zones, having a damper device for selecting one zone to be conditioned and a control device automatically actuable in conjunction with the damper for putting a control instrument in the one zone in command of the system.

The provision of combined summer and winter air conditioning systems of the zone type having damper means whereby an individual zone may be selected for conditioning and from which the cooling apparatus may be controlled and whereby if desired a plurality of zones may be simultaneously served.

Having these objects in mind and such others as will become apparent from the drawing and description, the manner of their accomplishment and the exact nature of my contribution to the art will become clear as my specification proceeds, the invention residing in the construction, arrangement and combination of parts, and method of producing the desired results, and toward which I have directed the appended claims.

The single figure of the drawing represents diagrammatically a combined heating and cooling system for a building having two zones, one being the upper floor and the other the lower floor, and having the control arrangement of my invention embodied therein.

Referring to the drawing, numeral 1 represents generally a gas fired warm air furnace having a combustion chamber 2 and an air heating casing 3 which forms a bonnet for the furnace. The combustion chamber 2 has a flue or stack 4 and has a burner 5 to which fuel is supplied by a conduit 6 which may communicate with the gas supply main. Interposed in the conduit 6 is a gas control valve 7 which I have shown as an electric solenoid type valve but which may take other suitable forms of motorized control valves. Numeral 8 indicates a pilot burner of the type conventionally used with this form of heating apparatus which is constantly supplied with fuel through a tube 9 communicating with the conduit 6 as shown. Located adjacent the flame of the pilot burner 8 is a safety pilot device 10 comprising a strip of bimetal cooperating with a fixed electrical contact 11 so as to form a switch and which operates in the usual manner of safety pilots to shut down the system in the event the pilot flame becomes extinguished.

Numeral 13 indicates a control instrument comprising two mercury switches 14 and 15 operated by a helical thermostatic element 16 which is positioned so as to be responsive to bonnet temperatures. The mercury switch 15 controls an electric motor driving a conventional furnace fan 18 which draws return air through a conduit 17, forces it through the casing 3 and to the spaces being heated by the system. Whenever the bonnet temperature rises to a predetermined value the element 16 closes the mercury switch 15 to start the fan 18. The mercury switch 14 is normally closed and forms a high limit switch which is opened whenever the bonnet temperature reaches a predetermined relatively high value. I will point out more particularly the manner of control of the apparatus and the various electrical circuits which I employ when I describe the operation of my system.

Connecting with the furnace casing 3 is an air duct 20 which has an enlarged portion 21 and which has two branches 22 and 23 which lead to the downstairs and the upstairs respectively of the building being served by the air conditioning equipment. As will become more clear as the specification proceeds, the downstairs, that is, the lower floor of the building, forms one zone and the upstairs, that is, the upper floor, forms a second zone. Disposed in the air duct 22 at the point at which it branches is a splitter type damper 24 which is operated by a damper motor 25 through a mechanical connection indicated by the broken line 26. The damper 24 may be moved to various positions as indicated by the broken line showings in the usual manner of splitter type dampers. One end 27 of the shaft of the motor 25 carries a disc 28 which is rotatable therewith and carried by the disc so as to be operated thereby is a double-ended mercury switch 29. I will refer to the mercury switch 29 later in the description of operation. The motor 25 may be of the proportioning type as disclosed in detail in the patent to Daniel G. Taylor, No. 2,028,110. The motor 25 may be supplied with power through wires 30 and 31 which may connect to suitable line conductors and I prefer to control this motor by a manual potentiometer comprising a resistance 32 and a manually operable slider 33 cooperating therewith. The ends of the resistance 32 and the slider 33 are connected to the motor 25 by wires 34 and 35 and wire 36 respectively. Obviously, I may manually control the motor 25 in the same manner as the corresponding motor of the Taylor patent is automatically controlled. While the motor 25 which I have disclosed is of the type having a multitude of positions, I of course may also use other types of motors which may be of the two-position type.

Located within the enlarged portion 21 of air duct 20 is the evaporating coil 39 of a conventional compression type refrigerating system having the usual compressor, condenser and expander. The refrigerating system comprises also a compressor 40 driven in any suitable manner, for example through a belt by an electric motor 41 and a condenser indicated at 42, the various elements of this system being connected in the usual circuit relationship of such a system with the discharge of the compressor connected to the condenser and the outlet of the evaporating coil 39 connected to the suction of the compressor. Interposed in the conduit connecting the outlet of the condenser to the inlet of the evaporating coil 39 is an electric solenoid stop valve 43 and also at the inlet of the evaporating coil 39 is a conventional thermostatically controlled expansion valve 44 controlled by a thermostatic bulb 45 responsive to the temperature of the outlet conduit of the evaporating coil 39. The thermostatic bulb 44 may be of the usual type filled with a volatile fluid, the pressure of which is communicated to the valve 44 through a capillary tube 46. The manner of operation of this type of thermostatic valve is well-known to those skilled in the art and therefore need not be described in further detail. The compressor motor 41 is controlled by a conventional type low pressure cut-out switch which I have diagrammatically shown at 37 as comprising an expansible bellows 47 operating a mercury switch 48 through a lever arm 49 which is biased towards the base of the expansible bellows 47 by a tension spring 50. The interior of the expansible bellows 47 is connected to the outlet conduit of the evaporating coil 39 by a tube 48 so that the bellows is responsive to the pressure within the evaporating coil. The low pressure controller 37 operates in the usual manner to close the mercury switch 48 to start the compressor motor 41 at a predetermined high pressure existing in the outlet conduit of the evaporating coil 39. At a predetermined low pressure the mercury switch 48 is opened and the compressor motor 41 stopped.

For automatically controlling the apparatus of my system, I provide an upstairs thermostat 53 and a similar downstairs thermostat 54 for controlling the cooling equipment. These two thermostats may be of a conventional type and I have diagrammatically disclosed them as comprising, for example (referring to thermostat 53) a temperature responsive bellows 55 filled with a suitable volatile fluid operating a mercury switch 56 through a lever arm 57 which is biased towards the base of the bellows 55 by a tension spring 58. The thermostat 54 may preferably be identical with thermostat 53 operating a similar mercury switch 59, and it therefore need not be separately described. As I have previously pointed out, the thermostat 53 is located in the zone comprising the upstairs and the thermostat 54 is located in the zone comprising the downstairs as indicated by the legend on the drawing.

Numeral 60 indicates generally another thermostat which may be of the conventional bimetallic element type which I employ to control the heating equipment of my system and which I may preferably locate downstairs as indicated on the drawing. The thermostat 60 has a movable switch blade 61 which cooperates with a fixed electrical contact 62 and also with a permanent magnet 63 whereby the blade 61 engages with and disengages from the contact 62 with a snap action in the usual manner of this type of thermostat.

For supplying power at suitable voltage to the various control instruments and devices, I employ suitable voltage transformers indicated at 66 and 67. The transformer 66 comprises a primary winding 68 and a secondary winding 69 and the transformer 67 comprises a primary winding 70 and a secondary winding 71. These transformers are of the voltage step-down type having a greater number of turns in the primary than in the secondary winding. Power for the entire system is supplied from line conductors 72 and 73 which may be connected to some suitable source of external power, not shown. It will be understood that in the summer time only the cooling equipment is operated and in the winter time only the heating equipment is operated. For shifting from the cooling side to the heating side of the system I provide a changeover switch indicated at 74. The switch 74 takes the position as shown in full lines during summer operation and takes the position shown in broken lines during winter operation. I will now describe the operation of my complete system, pointing out specifically the various electrical circuits which become effective and the manner in which the control is shifted from summer to winter operation by manipulating the switch 74.

With the parts in the position shown, the switch 74 is positioned for summer operation and the damper 24 is set so as to supply only the zone comprising the downstairs or lower floor with conditioned air. It will be seen that at this time the primary winding 70 of the transformer 67 is at all times energized through an electrical circuit which is as follows: from line conductor 73, through a portion of wire 80 to a wire 81, through the winding 70 and a wire 82 to a wire 83, switch 74 and a wire 84 back to the line conductor 72. At this time also the motor of the fan 18 is continuously energized for circulating air through the air duct 20 and to the zone being supplied with air, the circuit for the fan motor being as follows: from line conductor 73 to wire 80, through the fan motor, wire 85, a portion of wire 83, switch 74 and wire 84 back to the line conductor 72. As already pointed out, with the parts in the position shown the slider 33 has been manually set so that the motor 25 has positioned the damper 24 to entirely close off branch 23 so that only the lower floor is supplied with conditioned air through the branch duct 22. When the damper 24 is in the position as shown in full lines, the disc 28 has been rotated to a position in which the switch at the left end of the mercury tube 29 is closed as shown. This places the thermostat 54, which the downstairs thermostat, that is, in the zone being served with conditioned air, in control of the electric solenoid valve 43 which controls the supply of refrigerant to the evaporating coil 39. The thermostat 53 is ineffective at this time to control the cooling equipment as will become apparent by reason of the switch at the right end of mercury tube 29 being open. Whenever the temperature to which the downstairs thermostat is responsive rises to a predetermined value, the mercury switch 59 will be closed completing a circuit to the solenoid valve 43 to open that valve which is as follows: from mercury switch 59 to a wire 86 and a wire 87 through the secondary winding 71 of transformer 67, through a wire 88, solenoid valve 43, a wire 89 to the left end of mercury switch 29, and a wire 90 back to the mercury switch 59. Upon completion of this circuit the solenoid stop valve 43 opens and condensed refrigerant is supplied through the thermostatically controlled expansion valve 44 to the evaporating coil 39. As soon as refrigerant begins to enter the coil 39 the pressure therein rises and the pressure controller 37 is operated so as to close the mercury switch 48. Closure of the switch 48 energizes the compressor motor 41 through the following circuit: from line conductor 73 through a portion of wire 80, wire 91, through the compressor motor, wire 92, mercury switch 48, wire 83 through the switch 74, and wire 84 back to the line conductor 72. As soon as the compressor 40 begins operation, refrigeration will take place at coil 39 under control of the thermostatic valve 44 and cooled air will be supplied through the branch duct 22 to the zone formed by the lower floor of the building. Whenever the downstairs temperature reaches a value such as to satisfy the thermostat 54, the mercury switch 59 will be opened and the solenoid valve 43 will close, cutting off the supply of condensed refrigerant to the evaporating coil 39. As soon as the supply of refrigerant is cut off the compressor will pump the refrigerant out of the coil 39, quickly reducing the pressure therein to the point at which the controller 37 will operate to open the mercury switch 48 and thereby stopping the compressor motor 49.

From the above it is seen that my apparatus automatically functions to maintain a predetermined comfort temperature in the zone which may be chosen to be served. It is usual in residences that it is only necessary to condition the downstairs in the daytime and the upstairs sleeping rooms at night. In the evening at the time when people desire to retire I may manually operate the slider 33 of the manual potentiometer so as to cause the motor 25 to run to its other extreme position with the slider 33 at the right end of resistance 32 and with the damper 24 in its extreme left broken line position. In this latter position it will be seen that the branch duct 22 is completely closed off and conditioned air may only be supplied to the zone formed by the upper floor. Also when the motor is in this latter position, the disc 28 has been rotated so that the switch at the right end of mercury tube 29 is closed and that at the left end is open. When the mercury switch 29 is thus positioned the thermostat 54 is ineffective to control the cooling equipment and the thermostat 53 located upstairs in the zone into which conditioned air is now being supplied is in control of the cooling equipment. At the time that the thermostat 53 is placed in control of the cooling equipment, in all probability it will not be satisfied and will immediately complete a circuit to open the solenoid stop valve 43 which is as follows: from mercury switch 56 through wire 87, secondary winding 71 of transformer 67, wire 88, valve 43, wire 89, the right end of mercury switch 29, and wire 93 back to the mercury switch 56. As soon as the solenoid valve 43 opens the cooling equipment again operates in exactly the same manner as described in connection with the opening of solenoid valve 43 under control of the thermostat 54. Thus the zone formed by the upstairs of the building will now be maintained at a comfort temperature while no energy is expended for purposes of moderating the temperature downstairs. With my particular arrangement, obviously operating costs may be substantially reduced because a single zone may be served at a time rendering it unnecessary to consume energy in conditioning spaces which need not be conditioned at the time. If desired I may use air cooling equipment having only sufficient capacity to serve one zone at a time and therefore initial cost of equipment is correspondingly small. In order to select a zone to be served by the equipment, the manual potentiometer need only be positioned by moving the slider 33 with respect to the resistance 32. The mercury switch 29 is preferably constructed as an auxiliary switch which may be within the casing of the motor 25 or may be arranged externally thereof.

In the winter time when it becomes necessary to heat rather than cool the building, I may shift from the cooling to the heating side of the system by moving the changeover switch 74 to its broken line position as indicated on the drawing. In this position of the switch 74 the various circuits which have been described in connection with the operation of the cooling equipment may not be energized as is obvious from the drawing. With the switch 74 in its broken line position the primary 68 of the transformer 66 is continuously energized through the following circuit: from line conductor 72 to wire 84, switch 74, wire 94, winding 68, and wire 95 back to the line conductor 73. The supply of heat to the system is now controlled by the thermostat 60 which controls the gas valve 70 and upon closing of the thermostat indicating a call for heat completes a circuit thereto which is as follows: from the secondary winding 69 of transformer 66, through a wire 96, through the thermostat 60, wire 97, mercury switch 14, wire 98, safety pilot 10, wire 99, gas valve 7, and wire 100 back to the secondary winding 69. As soon as the valve 7 opens gas is supplied to the burner 5 and heating takes place within the combustion chamber 2. Unless the bonnet temperature is already above a predetermined value for which switch 15 is set to close by reason of a previous heating cycle, switch 15 will be closed completing a circuit for the motor of fan 18 which is as follows: from line conductor 73 through wire 80, through the fan motor, wire 101, mercury switch 15, wire 102, wire 94, switch 74 and wire 84 back to the line conductor 72. As soon as the fan begins operation air is forced through the casing 3 and heated therein, and through the duct 20 and branch duct 22 to the zone comprising the lower floor of the building, the damper 24 being at this time in the position shown in the drawing. It is a part of my invention that I may now operate the manual potentiometer so as to cause the damper 24 to assume its mid position, for example, as indicated by its broken line mid position on the drawing. Thus I may supply heated air to the zones formed by both the upstairs and downstairs, the supply of air being under the control of the thermostat 60. As is well known in the art, a single thermostat will satisfactorily control the heating of all parts of the house in this manner.

As is well understood in the art, and as has been previously stated, the bonnet temperature responsive switch 15 starts operation of the fan 18 whenever the bonnet temperature reaches a predetermined value and stops the fan whenever the bonnet temperature falls back to that predetermined value. The limit switch 14 breaks the circuit to the control valve 7 so as to shut down the system whenever the bonnet temperature reaches an excessively high value for which this switch is set. Whenever the thermostat 60 becomes satisfied the above described circuit therethrough is broken and the control valve 7 will be closed so as to shut off the supply of heat.

From the foregoing, it should be apparent to those skilled in the art that I have provided a system which is of simple construction and adapted to be applied to residences and the like, and which is free from complicated and expensive mechanisms. The nature of my system is such that it can be manufactured, installed and operated at a cost which renders it practical for the average home owner occupying the usual type residence, for example, one having an upstairs and a downstairs. It is to be appreciated, however, that the two zones need not necessarily be formed by the upstairs and downstairs of a building but may be comprised of different rooms situated on the same floor or arranged and used in such manner that all of them need not be air conditioned simultaneously. A feature of my invention is the simple arrangement which I have provided for thus cooling a single zone at a time and utilizing the same air distributing equipment for heating two or more zones simultaneously.

There are many modifications, variations and changes in my invention which will occur to those skilled in the art, and which may be made without departing from the spirit and scope thereof. My disclosure is therefore to be interpreted as illustrative only, the scope of my invention to be limited only as determined by the appended claims.

I claim as my invention:

1. In a temperature control system comprising, means for changing the temperature of a fluid medium, a plurality of zones, means for circulating the fluid medium from said temperature changing means into said zones, flow regulating means for dividing the fluid between said zones, a single motor for positioning said flow regulating means, modulating control means for said motor for causing the same selectively to position said flow regulating means in any predetermined position between extreme positions in which the fluid is substantially all directed into one of said zones, a switch positioned by said motor in accordance with damper position, a controller in each of said zones responsive to a condition in said zone indicative of the need of operation of said temperature changing means and adapted to control said temperature changing means, means including said switch for placing in control of said temperature changing means the controller in the zone to which the greater portion of the air is being directed.

2. In a temperature control system, means for changing the temperature of a fluid medium, a pair of zones, means for conveying fluid from said temperature changing means to said zones, a thermostat in each zone responsive to the temperature in that zone, damper means for determining the distribution of fluid treated by said temperature changing means between said zones, means including a single manual operator for modulatingly controlling the position of said damper means, and switch means operatively connected to said damper means for placing the thermostat in the zone receiving the greatest amount of fluid in control of said temperature changing means.

3. In a temperature control system, means for changing the temperature of a fluid medium, a pair of zones, means for conveying fluid from said temperature changing means to said zones, a thermostat in each zone responsive to the temperature in that zone, damper means for determining the distribution of fluid treated by said temperature changing means between said zones, means including a single manual operator for positioning said damper means so as to supply all the treated fluid selectively to either zone or to divide the treated fluid to both zones, and switch means operatively connected to said damper means for selectively placing one of said thermostats in control of said temperature changing means in accordance with the position of said damper means.

ELLSWORTH H. DANIELSON.